US010987660B2

(12) United States Patent
Schunk et al.

(10) Patent No.: US 10,987,660 B2
(45) Date of Patent: Apr. 27, 2021

(54) HEXAALUMINATE-COMPRISING CATALYST FOR THE REFORMING OF HYDROCARBONS AND A REFORMING PROCESS

(71) Applicant: BASF SE, Ludwigshafen (DE)

(72) Inventors: Stephan Schunk, Heidelberg (DE); Andrian Milanov, Mannheim (DE); Andreas Strasser, Neckarsteinach (DE); Guido Wasserschaff, Neckargemuend (DE); Thomas Roussiere, Mannheim (DE)

(73) Assignee: BASF SE

( * ) Notice: Subject to any disclaimer, the term of this patent is extended or adjusted under 35 U.S.C. 154(b) by 0 days.

(21) Appl. No.: 14/139,098

(22) Filed: Dec. 23, 2013

(65) Prior Publication Data
US 2014/0191449 A1 Jul. 10, 2014

Related U.S. Application Data

(62) Division of application No. 13/762,783, filed on Feb. 8, 2013.

(60) Provisional application No. 61/597,194, filed on Feb. 10, 2012.

(51) Int. Cl.
| *B01J 23/83* | (2006.01) |
| *B01J 23/78* | (2006.01) |
| *C01B 3/26* | (2006.01) |
| *C01B 3/40* | (2006.01) |
| *B01J 37/08* | (2006.01) |
| *B01J 35/00* | (2006.01) |
| *B01J 23/00* | (2006.01) |
| *B01J 35/02* | (2006.01) |
| *B01J 35/10* | (2006.01) |
| *B01J 37/00* | (2006.01) |
| *B01J 37/02* | (2006.01) |

(52) U.S. Cl.
CPC ............ *B01J 23/83* (2013.01); *B01J 23/002* (2013.01); *B01J 23/78* (2013.01); *B01J 35/002* (2013.01); *B01J 35/0006* (2013.01); *B01J 35/023* (2013.01); *B01J 35/1009* (2013.01); *B01J 35/1014* (2013.01); *B01J 37/0027* (2013.01); *B01J 37/0036* (2013.01); *B01J 37/0072* (2013.01); *B01J 37/0201* (2013.01); *B01J 37/08* (2013.01); *C01B 3/26* (2013.01); *C01B 3/40* (2013.01); *C01B 2203/0238* (2013.01); *C01B 2203/1041* (2013.01); *C01B 2203/1052* (2013.01); *C01B 2203/1241* (2013.01); *Y02A 50/20* (2018.01); *Y02P 20/141* (2015.11); *Y02P 20/52* (2015.11)

(58) Field of Classification Search
CPC ........................................................ B01J 23/83
See application file for complete search history.

(56) References Cited

U.S. PATENT DOCUMENTS

| 4,203,829 | A | * | 5/1980 | Bertolacini | ............... B01J 23/85 |
| | | | | | 208/216 R |
| 4,576,807 | A | * | 3/1986 | Loechelt, II | ........ C01B 33/2853 |
| | | | | | 423/709 |
| 5,830,822 | A | * | 11/1998 | Euzen | .................... B01J 23/002 |
| | | | | | 502/355 |
| 6,207,130 | B1 | * | 3/2001 | Kareiva | ................. B82Y 30/00 |
| | | | | | 423/252 |
| 6,413,489 | B1 | | 7/2002 | Ying et al. | |
| 7,442,669 | B2 | | 10/2008 | Wickham et al. | |
| 2002/0110519 | A1 | | 8/2002 | Ying et al. | |
| 2003/0176278 | A1 | * | 9/2003 | Wickham | ................. B01J 21/04 |
| | | | | | 502/302 |
| 2004/0242941 | A1 | | 12/2004 | Green et al. | |
| 2005/0250863 | A1 | * | 11/2005 | Green et al. | .................. 518/703 |
| 2005/0265920 | A1 | * | 12/2005 | Ercan | ...................... B01J 21/04 |
| | | | | | 423/651 |

(Continued)

FOREIGN PATENT DOCUMENTS

| CN | 101306361 A | 11/2008 |
| CN | 101927160 A | 12/2010 |

(Continued)

OTHER PUBLICATIONS

The crystal structure of barium hexaaluminate phase I (barium beta-alumina) Iyi et al. J. of Solid State Chemistry vol. 52, Issue 1, 1984, pp. 66-72 however only the Abstract is provided.*
The partial oxidation of methane to syngas over the nickel-modified hexaaluminate catalysts BaNiyAl12-yO19-delta Wenling Chu, Weishen Yang, Liwu Lin Appiled Catalysts A: General vol. 235, pp. 39-45, 2002.*

(Continued)

*Primary Examiner* — Douglas B Call
(74) *Attorney, Agent, or Firm* — Faegre Drinker Biddle & Reath LLP

(57) ABSTRACT

A hexaaluminate-containing catalyst containing a hexaaluminate-containing phase which includes cobalt and at least one further element of La, Ba or Sr. The catalyst contains 2 to 15 mol % Co, 70 to 90 mol % Al, and 2 to 25 mol % of the further element of La, Ba or Sr. In addition to the hexaaluminate-containing phase, the catalyst can include 0 to 50% by weight of an oxidic secondary phase. The process of preparing the catalyst includes contacting an aluminum oxide source with cobalt species and at least with an element from the group of La, Ba and Sr. The molded and dried material is preferably calcined at a temperature greater than or equal to 800° C. In the reforming process for reacting hydrocarbons in the presence of $CO_2$, the catalyst is used at a process temperature of greater than 700° C., with the process pressure being greater than 5 bar.

27 Claims, 4 Drawing Sheets

(56) References Cited

U.S. PATENT DOCUMENTS

| | | | |
|---|---|---|---|
| 2006/0093550 A1* | 5/2006 | Choudhary et al. | ........... 423/651 |
| 2006/0179717 A1* | 8/2006 | LaBarge | ................ B01J 21/066 |
| | | | 48/127.9 |
| 2007/0111884 A1* | 5/2007 | Chen et al. | .................... 502/303 |
| 2007/0112080 A1 | 5/2007 | Green et al. | |
| 2008/0314798 A1* | 12/2008 | Stockwell et al. | ............. 208/118 |
| 2011/0039691 A1 | 2/2011 | Tomoda et al. | |
| 2011/0245073 A1* | 10/2011 | Oljaca | .................. B01D 53/944 |
| | | | 502/304 |
| 2013/0085062 A1* | 4/2013 | Ferrandon | ............... C01F 7/002 |
| | | | 502/303 |
| 2013/0116116 A1 | 5/2013 | Schwab et al. | |
| 2013/0116351 A1 | 5/2013 | Querner et al. | |

FOREIGN PATENT DOCUMENTS

| | | | |
|---|---|---|---|
| EP | 2 119 671 A1 | | 11/2009 |
| WO | WO 03/002252 | * | 6/2002 |
| WO | 03/002252 A1 | | 1/2003 |

OTHER PUBLICATIONS

Catalytic partial oxidation of methane using RhSr- and Ni-substituted hexaaluminates Huayang Zhu et al. Proceedings of the Combustion Institute, vol. 31, pp. 1965-1972 (Year: 2007).*

Extended European Search Report dated Jun. 28, 2012 in Patent Application No. 12154901.8 (with English translation of Categories of Cited Documents).

Todd H. Gardner, "Hexaaluminate Catalysts for the Partial Oxidation of Middle Distillate Fuels (Dissertation)", West Virginia University, XP002677396, 2007, 174 pages.

J. Kirchnerova et al., "Design criteria for high-temperature combustion catalysts", Catalysis Letters, XP055029132, vol. 67, 2000, pp. 175-181.

Anders Ersson et al., "A comparison between hexaaluminates and perovskites for catalytic combustion applications", Catalysis Today, XP027976081, vol. 112, 2006, pp. 157-160 with cover page.

Lin-chiuan Yan et al., "Synthesis and characterization of aerogel-derived cation-substituted barium hexaaluminates", Applied Catalysis A: General, XP055029128, vol. 171, 1998, pp. 219-228.

Wenling Chu et al., "Selective oxidation of methane to syngas over NiO/barium hexaaluminate", Catalysis Letters, vol. 74, No. 3-4, 2001, pp. 139-144.

Masato Machida et al., "Effect of Additives on the Surface Area of Oxide Supports for Catalytic Combustion", Journal of Catalysis, vol. 103, 1987, pp. 385-393.

Sri Nugroho et al., "Solid-state synthesis and formation mechanism of barium hexaaluminate from mechanically activated $Al_2O_3$-$BaCO_3$ powder mixtures", Journal of Alloys and Compounds, vol. 502, 2010, pp. 466-471 with cover page.

G. Groppi et al., "Preparation and characterization of hexaaluminate-based materials for catalytic combustion", Applied Catalysis A: General, vol. 104, 1993, pp. 101-108.

JunXia Wang et al., "Methane reforming with carbon dioxide to synthesis gas over Co-doped Ni-based magnetoplumbite catalysts", Applied Catalysis A: General, vol. 250, 2003, pp. 13-23.

Ryuji Kikuchi et al., "Partial oxidation of $CH_4$ and $C_3H_8$ over hexaaluminate-type oxides", Applied Catalysis A: General, vol. 281, 2005, pp. 61-67.

O. Yokota et al., "Hexaaluminate Catalysts of the Novel Process of Syngas Production through Catalytic Oxidation and Steam-$CO_2$ Reforming of Methane", Studies in Surface Science and Catalysis, vol. 153, 2004, pp. 141-144 with cover pages.

International Search Report dated Jul. 18, 2013 in PCT/IB2013/051024 filed on Feb. 7, 2013.

Zhanlin Xu et al., "Catalytic properties of Ni modified hexaaluminates $LaNi_yAl_{12-y}O_{19-\sigma}$ for $CO_2$ reforming of methane to synthesis gas", Applied Catalysis A: General, vol. 198, 2000, pp. 267-273.

Decision to Grant dated Jun. 13, 2017 in corresponding Russian Patent Application No. 14136535, 11 pages.

* cited by examiner

HEXAALUMINATE-COMPRISING CATALYST FOR THE REFORMING OF HYDROCARBONS AND A REFORMING PROCESS

CROSS REFERENCE TO RELATED APPLICATIONS

This application is a Divisional of U.S. patent application Ser. No. 13/762,783 filed on Feb. 8, 2013, and claims priority to U.S. Provisional Application No. 61/597,194 filed on Feb. 10, 2012, the entire contents of each of which are hereby incorporated by reference.

Desciption

The invention relates to a process for preparing a catalyst for the reforming of hydrocarbon-comprising compounds and the use of the catalyst of the invention in connection with the reforming of hydrocarbons, preferably $CH_4$, in the presence of $CO_2$. To prepare the catalyst, an aluminum source, preferably an aluminum hydroxide, preferably made up of small primary particles, preferably having a primary particle size of less than or equal to 500 nm, is brought into contact with a cobalt-comprising metal salt solution, dried and calcined. The metal salt solution comprises at least one element of the group consisting of La, Ba, Sr in addition to the cobalt species.

The reforming of methane and carbon dioxide is of great economic interest since synthesis gas can be produced by means of this process. Synthesis gas forms a raw material for the preparation of basic chemicals. In addition, the use of carbon dioxide as starting material is of significant importance in the chemical syntheses in order to bind carbon dioxide obtained as waste product in numerous processes by a chemical route and thereby avoid emission into the atmosphere.

In accordance with its great economic importance, the reforming of hydrocarbons in the presence of carbon dioxide is subject matter of numerous publications. A short overview of the substantive focal points of these publications will be given below.

The catalytic properties of nickel-modified hexaaluminates for the reforming of methane and carbon dioxide to give synthesis gas are disclosed, for example, in a publication by Zhalin Xu et al. (Zhalin Xu, Ming Zhen, Yingli Bi Kaiji Zhen, Applied Catalysis A: General 198 (2000) pp. 267-273). The nickel-modified hexaaluminates used here have a greater activity and display a better stability compared to the conventional nickel-comprising catalyst in which the nickel is deposited on the support materials.

A publication by Yokata et al. reports the use of hexaaluminate-comprising catalysts for synthesis gas production from the reforming of methane in the presence of $CO_2$ and steam (O. Yokata, T. Tanaka, Z. Hou, T. Yashima; Stud. Surf. Sci. and Cat. 153 (2004) p. 141-144. The study relates to nickel- and manganese-comprising hexaaluminates, with the manganese-comprising hexaaluminates being able to comprise elements from the group consisting of Ba, La and Sr and also a mixture of $Sr_{0.8}La_{0.2}$. The catalytic characterization of the catalysts is carried out in the presence of $CH_4/H_2O/CO_2$ (in a volume ratio of 150/100/50) under atmospheric pressure at a temperature of 700° C. The flow rate is 18 000 $hr^{-1}$.

J. Wang et al. reports the reforming of methane to give synthesis gas using catalysts composed of nickel-comprising magnetoplumbites which are doped with cobalt or in which the nickel has been completely replaced by cobalt (J. Wang, Y. Liu, T X. Cheng, W X. Li, Y L. Bi, K J. Zhen, Appl. Catalysis A: General 250 (2003) p. 13-23). The catalysts disclosed by Wang et al. are described by the empirical formula $LaNi_xCo_{1-x}Al_{11}O_{19\square}$, and a cobalt-lanthanum-comprising hexaaluminate in which x=0, which is free of nickel, also disclosed. The preparation of the catalysts disclosed by Wang et al. is based on the use of aluminum nitrate salt which is decomposed together with the other metal nitrate salts (i.e. La, Ni and Co or La and Co) in the presence of PEG/isopropyl alcohol. The catalytic reforming studies are carried out at temperatures of up to 800° C. and a GHSV of 9600 $hr^{-1}$. The nickel-free hexaaluminate catalyst having the composition $LaCoAl_{11}O_{19}$ displays only a very low activity in respect of the conversion of methane and $CO_2$ studied. In general, the results of Wang et al. show that the catalytic efficiency of the catalysts is disadvantageously influenced by the addition of cobalt.

In U.S. Pat. No. 7,442,669 B2, D. Wickham et al. disclose an oxidation catalyst comprising metal-exchanged hexaaluminates. The catalyst has a good catalytic activity and stability at high temperatures, with the activity also being maintained over a prolonged period of time. In general the catalysts are suitable as oxidation catalysts and in particular in methane combustion, with, in particular, the use in turbines operated using natural gas being of importance. The synthesis of the hexaaluminate-comprising catalysts is based on the use of boehmite particles.

The hexaaluminates disclosed in U.S. Pat. No. 7,442,669 B2 comprise up to three different metal species selected from the groups $M_1$, $M_2$ and $M_3$. The group $M_1$ comprises elements from the group of the rare earths, the group $M_2$ comprises elements from the group of the alkaline earth elements and the group $M_3$ comprises elements from the group of the transition metals, with mention being made of Mn, Fe, Co, Ni, Cu, Ag, Au, Rh, Ru, Pd, Ir and Pt. To characterize the catalysts, these were tested for the methane decomposition activity, with the catalysts being exposed to a gas stream comprising 3% by volume of methane. The studies were carried out at a pressure of 5 bar and a GHSV of 17 000 $hr^{-1}$. The temperature $T_{1/2}$ which is required for fifty percent of the methane to react was determined as a measure of the efficiency of the catalysts. The catalysts tested were subjected to different aging regimes before the catalytic study.

EP 2 119 671 discloses the synthesis of hexaaluminate-comprising catalysts in the presence of template materials. The template materials are advantageous for the formation of particular pore structures in the hexaaluminates, which are prepared by means of the process according to EP 2 119 671.

A large number of publications relate to the use of hexaaluminate-comprising catalysts for the oxidation or partial oxidation of hydrocarbons in the presence of oxygen. When carrying out partial oxidations, very short contact times are desirable in order to prevent complete oxidation of the hydrocarbons. For this purpose, it is necessary to carry out the reactions at high flow rates, a low hydrocarbon concentration and in the presence of oxygen. Examples of such disclosures are: Kikuchi et al. (R. Kikuchi, Y. Iwasa, T. Takeguchi, K. Eguchi; Applied Catalysis A: General 281 (2005) p. 61-67), G. Groppi (Applied Catalysis A: General 104 (1993) p. 101-108.

In general, various processes for preparing hexaaluminate-comprising catalysts have been published in the prior art, but in all of these the respective starting components are subjected to a thermal treatment at temperatures of 1200° C. and above.

For example, S. Nugroho et al. describe the preparation of phase-pure barium hexaaluminate which was obtained by heating of barium oxide and aluminum oxide (i.e. BaO and $Al_2O_3$) in a solid state reaction at temperatures of 1450° C. (see S. Nugroho et al., Journal of Alloys and Compounds, 2010, 502, pp. 466-471).

M. Machida et al. (M. Machida et al, Journal of Catalysis, 1987, 103, pp. 385-393) disclose the preparation of phase-pure barium hexaaluminates which are obtained by hydrolysis of the corresponding alkoxides, with these being treated at temperatures up to 1300° C. The resulting hexaaluminate phases have surface areas of 11 $m^2/g$.

Chu et al. describe a preparation of barium hexaaluminates by carbonate precipitation (see W. Chu et al., Catalysis Letters, 2001, 74, pp. 139-144). In the thermal treatment, temperatures of 1200° C. were necessary in order to obtain the materials with a high phase purity in respect of the barium hexaaluminate phase. It is reported that the materials have surface areas of 17 $m^2/g$.

Apart from the above, there is also a single disclosure in the prior art by F. Yin et al. on the preparation of hexaaluminates by means of combustion of urea (i.e. the urea combustion process) which differs from other disclosures in that the thermal treatment of the starting materials is carried out at a much lower temperature than in the case of the other known processes. F. Yin et al. indicate that the phase-pure hexaaluminate material was obtained at as low as 500° C. The material obtained had a surface area of 20 $m^2/g$.

US2007/0111884 A1 (Laiyuan Chen et al and Delphi as applicant) discloses and claims catalyst support materials which comprise hexaaluminates and alumina and are provided with rhodium as active component. To produce the catalyst material, the starting materials are combined with a stoichiometric excess of an aluminum-comprising component, so that not only the hexaaluminate-comprising phase but also the alumina secondary phase is formed in the synthesis. US2007/0111884 A1 discloses hexaaluminates which can comprise various cations, which mention also being made of lanthanum-comprising hexaaluminates which can comprise various divalent cations such as Mg, Ca, Ni, Co, Zn and Fe. Various processes are disclosed for producing the catalyst support materials and catalysts, and these differ from one another in respect of the mixing steps used and the thermal treatment steps. The catalysts according to the invention, which according to the disclosure are all doped with rhodium as active metal, are used in a process for the partial oxidation of gasoline in the presence of oxygen so as to produce a hydrogen-rich gas mixture. In the partial oxidation reactions used for reforming fuels, temperatures in the region of 1000° C. and higher can occur and because of the high temperatures it is necessary to develop particularly sintering-resistant catalysts for this purpose.

In his doctoral thesis in 2007, Todd H. Gardner discussed in a very pioneering way the use of hexaaluminates as catalysts for the partial oxidation of fuels obtained in the middle fraction from the distillation. In particular, lanthanum-comprising, barium-comprising and strontium-comprising hexaaluminates which can comprise various transition metal cations are also described. The focus of the work is the examination of hexaaluminates comprising nickel, cobalt or iron, with the transition metals being present in different ratios and being combined with the cations from the group consisting of Sr, La and Ba, which are likewise present in various ratios. The work is aimed at examination of pure-phase hexaaluminates. Gardner reports that although phase impurities are not ruled out, they would have been present only in very low concentrations. To characterize the catalytic properties, the catalysts were used for the partial oxidation of n-tetradecane. The partial oxidations were carried out at a pressure of about 2 bar, a GHSV of 50 000 and using an oxygen-to-carbon ratio (i.e. O to C) of 1.2.

A publication by J. Kirchnerova (in Catalysis Letters 67 (2000) p. 175-181) describes the criteria for the design of new high-temperature catalysts for the catalysis of combustion reactions. The publication also relates to the production and testing of materials having a perovskite structure and to materials having a hexaaluminate structure. Here, hexaaluminates comprising Sr, La and Mn (i.e. have the structural formula $Sr_{0.8}La_{0.2}MnAl_{11}O_{19}$) are described. It may also be mentioned that the use of boehmites as starting material in the synthesis of the materials is disclosed. A conclusion drawn by Kirchnerova et al is that those perovskites which have particular transition metals can display activity in catalytic combustion. The catalytic experiments to characterize the catalysts are based on the oxidation of methane to carbon dioxide in the presence of air, with the methane content being indicated to be 2%.

CN 101306361 A discloses hexaaluminates which are used as catalysts for carrying out reactions for the oxidation of hydrocarbons. The hexaaluminates have the cationic species La, Ba or Ca as stabilizing elements and the hexaaluminates can have Cr, Mn, Fe, Co, Ni or Cu as transition metal cations.

Figure 1:
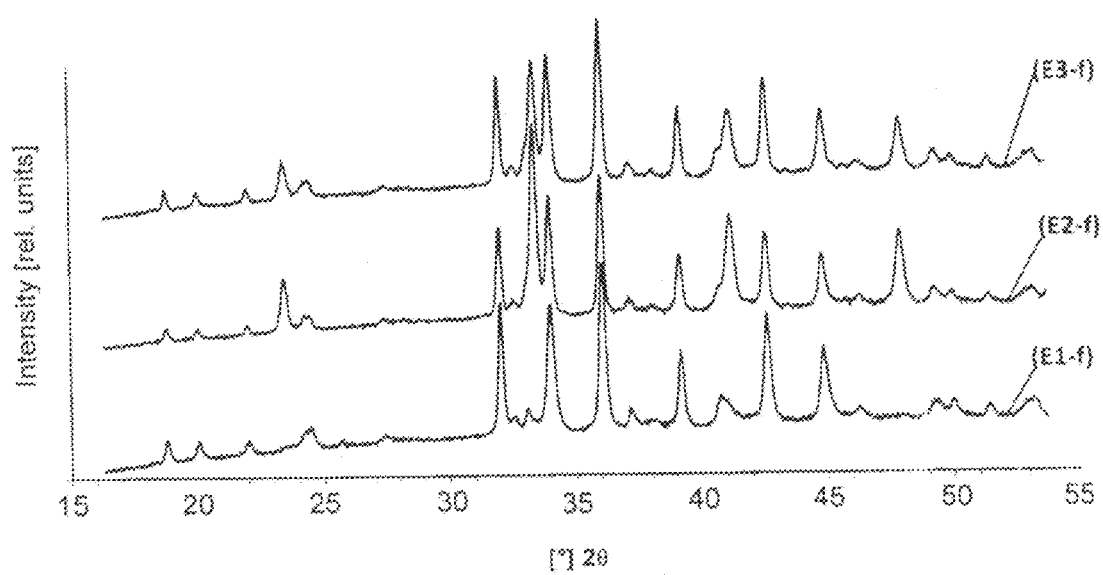
FIG. 1 shows three diffraction patterns recorded on fresh catalyst samples according to the invention.

It is an object of the invention to provide an improved catalyst, an improved process for preparing hexaaluminate-comprising catalysts and an improved process for the reforming of hydrocarbons and $CO_2$ to give synthesis gas.

Apart from the above, the preparative process should also be very energy-efficient and sparing of resources. At the same time, it is an object to obtain material with a low proportion of impurities.

A further object of the invention is to provide a hexaaluminate-comprising catalyst which comprises a very small proportion of lanthanum or in which lanthanum can be replaced by chemical elements which are available on an industrial production scale and are not toxic.

The objects mentioned here and further objects are achieved by provision of a hexaaluminate-comprising catalyst and by a process for preparing a hexaaluminate-comprising catalyst. The hexaaluminate-comprising catalyst is used in a process for the reforming of hydrocarbons, preferably methane, and $CO_2$, which is described in more detail below.

A. The hexaaluminate-comprising catalyst of the invention comprises cobalt and at least one further element from the group consisting of Ba, Sr, La, where the Co content is in the range 2-15 mol %, preferably 3-10 mol % and more preferably in the range 4-8 mol %, the content of the at least one further element from the group consisting of Ba, Sr, La is in the range 2-25 mol %, preferably 3-15 mol %, more preferably 4-10 mol %, and the content of Al is in the range 70-90 mol %.

On the basis of the ranges for the molar proportions indicated here, the following molar ratios for the metal ion species can be determined: the molar ratio of Co to Al (i.e. the $n_{Co}/n_{Al}$ ratio) is in the range 0.03-0.17, preferably 0.043-0.11 and more preferably 0.057-0.08. The molar ratio of $M^{BaSrLa}$ to Al (i.e. the $n_{MBaSrLa}/n_{Al}$ ratio) is in the range 0.029-0.28, preferably 0.043-0.17 and more preferably in the range 0.057-0.11. The molar ratio of Co to $m^{BaSrLa}$ (i.e. The $n_{Co}/n_{MBaSrLa}$ ratio) lies in the range 1.0-0.6, preferably 1.0-0.67 and more preferably 1.0-0.8.

In addition, particular preference is given to the molar ratios of the elements comprised in the catalyst to be in the following ranges: the ratio of cobalt to aluminum (i.e. the $n_{Co}/n_{Al}$ ratio) is in the range from 0.05 to 0.09 and particularly preferably in the range from 0.06 to 0.08. In a preferred embodiment of the catalyst of the invention, the molar ratio of $M^{BaSrLa}$ to aluminum (i.e. the the $n_{MBaSrLa}/n_{Al}$ ratio) is in the range from 0.09 to 0.25, particularly preferably in the range from 0.092 to 0.20. Furthermore, the molar ratio of Co to $M^{BaSrLa}$ (i.e. the $n_{Co}/n_{MBaSrLa}$ ratio) is preferably in the range from 1.0 to 0.3 and particularly preferably in the range from 0.85 to 0.40.

A material which consists entirely of cobalt hexaaluminate and comprises at least one element from the group consisting of Ba, Sr, La can be described by the empirical formula $CoM^{BaSrLa}Al_{11}O_{19}$. In this case, the metallic species have the following stoichiometric ratios: the molar ratio of Co to Al (i.e. the $n_{Co}/n_{Al}$ ratio) is 1, the molar ratio of $M^{BaSrLa}$ to Al (i.e. the $n_{MBaSrLa}/n_{Al}$ ratio) is 0.091 and the molar ratio of Co to $M^{BaSrLa}$ (i.e. the $n_{Co}/n_{MBaSrLa}$ ratio) is 1.

Comparison of the composition of the catalyst of the invention with a material which consists entirely of cobalt hexaaluminate phase indicates that the catalyst of the invention (preferably) has a lower proportion of cobalt (relative to aluminum) and a higher proportion of cationic species from the group consisting of Ba, Sr, La (relative to cobalt) compared to the pure-phase cobalt hexaaluminate. Based on the pure-phase cobalt hexaaluminate, this means that the catalyst of the invention has a substoichiometric amount of cobalt and a superstoichiometric amount of cationic species from the group consisting of Ba, Sr, La.

An explanation of the formation of the catalyst of the invention is that the cobalt-comprising species added to the synthesis system are virtually completely or completely incorporated into the structure of the cobalt hexaaluminate phase and cobalt is no longer available for the formation of the secondary phase. The formation of the secondary phase proceeds from the aluminum-comprising species and the cationic species from the group consisting of Ba, Sr, La used in each case, which leads to aluminates or perovskites (e.g. $SrAl_2O_4$, $LaAlO_3$ etc.) or other phases of the elements La, Sr, Ba, Al known to those skilled in the art being predominantly formed as secondary phase. It follows therefrom that the proportion of free aluminum oxide and the associated number of Lewis acid sites can be minimized. However, the explanation given above is not intended to restrict the invention in any way.

In a preferred embodiment, the catalyst of the invention comprises secondary phases or a secondary phase, where the total proportion of the secondary phases is in the range 0-50% by weight, preferably in the range 3-40% by weight and more preferably in the range 5-30% by weight. The secondary phase preferably comprises oxides, and these are more preferably from the group consisting of alpha-aluminum oxide, theta-aluminum oxide, $LaAlO_3$, $BaAl_2O_4$, $SrAl_2O_4$, $CoAl_2O_4$, La-stabilized aluminum oxide and/or La-stabilized aluminum oxide hydroxide.

In a preferred embodiment, the catalyst comprises at least one noble metal-comprising promoter from the group consisting of Pt, Rh, Pd, Ir, where the proportion of noble metal-comprising promoters is in the range 0.1-3 mol %.

In a further embodiment, the catalyst also comprises a proportion of further cations which are preferably selected from the group consisting of Mg, Ca, Ga, Be, Ni, Fe, Cr, Mn, with Mg being particularly preferred.

It is also conceivable that, as alternatives to the at least one element from the group consisting of Ba, Sr, La, a further element or plurality of elements from the group of the lanthanides can be present in the catalyst of the invention. It is also not to be ruled out that the performance properties of the catalyst of the invention can be improved further by the incorporation of specific secondary phases or a combination of secondary phases within the catalyst.

B. The hexaaluminate-comprising catalyst can be prepared by means of the following steps:
(i) producing of an aluminum source, preferably a finely divided aluminum oxide and/or hydroxide modification,
(ii) contacting of the finely divided aluminum source with a fusible or soluble cobalt-comprising compound and at least one further soluble or fusible metal salt,
(iii) intimate mixing of the aluminum source and the dissolved or molten metal salts,
(iv) drying of the mixture,
(v) low-temperature calcination of the mixture,
(vi) molding or shaping,
(vii) high-temperature calcination of the mixture.

The at least one further soluble or fusible metal salt comprises a metal salt which is selected from the group consisting of barium, strontium and lanthanum.

In a preferred embodiment, the further soluble metal salt comprises at least two metal salts, in which at least barium-comprising species are present in combination with strontium-comprising species or at least barium-comprising species are present in combination with lanthanum-comprising species or strontium-comprising species are present in combination with lanthanum-comprising species.

When the metal salts are not present in the form of the melt but in the form of the dissolved metal salts during mixing in step (iii), a solvent is also added to the metal salts if these have not been used in the dissolved state.

In a particularly preferred embodiment, the aluminum source is selected from the group consisting of high reactive aluminum oxides and aluminum hydroxides. The aluminum source preferably comprises dispersible primary particles, with a primary particle size of less than or equal to 500 nm being preferred.

C. Part of the invention also provides the process for preparing the hexaaluminate-comprising catalyst.

Hexaaluminate-Comprising Catalyst/Hexaaluminate Phase

For the purposes of the present disclosure, the term hexaaluminate-comprising catalyst comprises materials which have a high proportion of hexaaluminate phase. This means that the hexaaluminate-comprising catalyst can, in particular embodiments, also comprise a certain proportion of secondary phases. The term hexaaluminate phase comprises phases which have a sheet structure similar to or the same as the types of magnetoplumbite structure and/or the beta-aluminate structure, e.g. beta'- or beta"-aluminate structure. If the catalyst comprises secondary phases, the proportion of secondary phase is in the range 0-50% by weight, preferably in the range 3-40% by weight and more preferably in the range 5-30% by weight.

The proportion of hexaaluminate-comprising phase can be determined by diffractometric methods, for example the Rietfeld refinement. If particularly finely divided or nanocrystalline materials are present, the proportion of hexaaluminate phase is determined by means of an optic analysis by the Kubelka-Munk method. Here, a highly sintered reference sample having the same stoichiometry as the sample to be measured (in respect of the proportion of crystalline phase) is prepared and this is then designated as standard sample. The samples to be measured are compared to the standard sample as reference, with the reference having been assigned a value of one hundred percent beforehand. The optical analysis method is preferred in the case of nanocrystalline material when these have very small crystallites having a short coherence length. Short coherence lengths are present, (in the case of diffractometric studies using an X-ray wavelength of 0.154 nm), particularly when the crystallite sizes are less than 0.5 nm, preferably less than 0.4 nm and more preferably less than 0.3 nm. Such nanocrystalline materials can be provided such that they appear as X-ray-amorphous in powder diffraction and as crystalline in the UV analysis.

Aluminum Source

As aluminum source, it is in principle possible to use all aluminum-comprising starting materials, and a preferred aluminum source is selected from the group consisting of: pseudoboehmite, boehmite, gibbsite, bayerites, gamma-aluminum oxide, theta-aluminum oxide, hydrotalcites such as magnesium hydrotalcite, colloidal basic aluminum oxides and other colloidal aluminum sources known to those skilled in the art and also mixtures of these. Included are, in particular, the following products, inter alia, from Sasol: Disperal and all Disperal types, Dispal, Pural, Puralox, Catalox, Catapal and also all Pural MG types.

Without restricting the process of the invention by a theory, it is assumed that the surface structure of the highly reactive aluminum oxide or aluminum hydroxide source, for example theta-aluminum oxide, gamma-aluminum oxide, pseudoboehmite, boehmite, gibbsite, bayerite and mixtures of the abovementioned and other highly reactive aluminum oxide or aluminum hydroxide sources could have a substantial influence on the formation of an active catalyst. The boehmite used preferably comprises dispersible particles, with the primary particle size preferably being in the range of less than or equal to 500 nm. The term dispersible particles means that the particles dispersed or slurried in water form a stable dispersion and precipitate only after a long time.

The aluminum source is preferably a nanoparticulate aluminum-comprising starting material or colloidal primary particles. As nanoparticulate aluminum-comprising starting materials, it is possible to use, for example, peptized aluminum hydroxides, aluminum oxide hydrates or aluminum oxides. The peptization can be carried out by means of organic acids, for example acetic acid, propionic acid, or by means of inorganic acids, for example nitric acid or hydrochloric acid. The colloidal particles can be admixed with stabilizers such as surfactants, soluble polymers or salts, or such stabilizers can be used in the production process. The colloidal primary particles can also comprise partially hydrolyzed alkoxides.

In a specific embodiment, it is also possible to use shaped bodies of the abovementioned aluminum oxide sources, which are then brought into contact with the metal compounds. Examples of such shaped bodies are, inter alia, pellets, extrudates or granulated material or other shaped bodies known to those skilled in the art.

The use of a highly reactive aluminum oxide or aluminum hydroxide source is particularly advantageous because it aids the formation of desired phases.

As metal compounds, preference is given to using any compounds which are soluble in solvents or can be melted in the temperature range up to 250° C. and are available industrially at low cost. Preferred solvents include, inter alia, the following: water, acidic or alkaline aqueous solutions, alcohols such as methanol, ethanol, propanol, isopropanol, butanol, ketones such as acetone or methyl ethyl ketone, aromatic solvents such as toluene or xylenes, aliphatic solvents such as cyclohexane or n-hexane, ethers and polyethers such as tetrahydrofuran, diethyl ether or diglyme, esters such as methyl acetate or ethyl acetate.

Furthermore, particular preference is given to using soluble salts, complexes or metal-organic compounds as metal compounds. Examples of salts are, inter alia, nitrates, nitrites, carbonates, halides, acetates, octanoates. Examples of complexes are, inter alia, EDTA complexes, complexes with amino acid or amines, complexes with polyols or polyacids, complexes with phosphanes. Examples of metal-organic compounds are, inter alia, acetylacetonates, alkoxides, alkyl compounds, compounds with aromatics, e.g. cyclopentadienyl adducts.

As fusible metal compounds, preference is given to using metal salts which do not decompose during melting or in the case of which the decomposition is greatly kinetically inhibited. Examples of such metal salts are, inter alia, nitrates, nitrites, halides, chlorates, bromates, iodates, sulfates, sulfites. Particular preference is given to nitrates, nitrites or salt melts comprising nitrates and nitrites.

Suitable metals of contacting the metal compounds with the aluminum source are, inter alia, impregnation methods in which the metal compounds are dissolved in suitable solvents which are subsequently removed by drying. Such a drying step can, in the case of a pulverulent aluminum source, be carried out, for example, by freeze drying or spray drying; as an alternative, spray granulation or pure static drying of the composites formed can be carried out. For the purposes of the invention, impregnation is a particularly preferred method.

Further suitable methods of contacting are, inter alia, kneading or milling of the aluminum source in the presence of the metal compounds with or without addition of liquids. Kneading in particular is, for the purposes of the invention, a preferred method since it allows coupling with subsequent extrusion and can thus be advantageous for shaping.

For the purposes of the invention, preference is given, in particular, to metal salts which aid formation of the hexaaluminate phase in the presence of cobalt.

Such salts are, inter alia, lanthanum, barium and strontium. Lanthanum, barium and strontium are incorporated as interlayer cations. According to the invention, the use of one or more of these cations is included. This can form both materials which incorporate various cations in the interlayer plane (mixed crystal formation, i.e. single crystallites which incorporate both strontium and barium in the interlayer planes, for example) and also those which in each case form only crystallites having one type of cation species in the interlayer plane but are then present as a mixture of crystallites having different types of cation species (i.e., for example, a crystal mixture of crystallites having only barium as interlayer cations with crystallites having only strontium as interlayer cations). According to the invention, both types of mixture (i.e. mixed crystals and crystal mixture) are included.

Further cations which are preferred for the purposes of the invention are those which like cobalt are incorporated in the spinel blocks. Preference is given to, inter alia, magnesium, calcium, gallium, beryllium, nickel, iron, chromium, manganese. Particular preference is given to magnesium.

It has, completely surprisingly, been found that carrying out the high-temperature calcination at relatively low temperatures in the temperature range from 800° C. to 1300° C., preferably in the temperature range from 850° C. to 1200° C., particularly preferably in the temperature range from 900° C. to 1100° C., also leads to catalysts which have very good catalytic performance properties in respect of the process of the invention for producing synthesis gas.

We have thus found an advantageous temperature window for the high-temperature calcination and the preparation of the catalyst of the invention which gives a synergist effect between the performance properties of the materials of the invention in respect of synthesis gas production and the particularly high energy efficiency in the process for preparing the catalyst. The preparative process for the catalyst or the catalyst precursor material is particularly preferably carried out in the presence of seed crystals. Particular preference is given to using seed crystals which have the hexaaluminate structure or a composition similar to the target phase. The seed crystals very particularly preferably have a high crystallinity. Particular preference is given to carrying out the preparative process for the catalyst or the catalyst precursor material in the presence of seed crystals.

A possible effect which can be achieved by the addition of seed crystals is lowering of the formation temperature of the hexaaluminate phase when carrying out the process of the invention or an increase in the yield of hexaaluminate-comprising phase. It is also not ruled out that the formation temperature is lowered and at the same time the yield is increased. A further advantageous effect associated with the addition of seed crystals is a possible shortening of the crystallization time.

As regards the seed crystals, it may be said that these comprise, in a preferred embodiment of the process of the invention, a material having a hexaaluminate phase, the target product, more preferably phase-pure hexaaluminate. Furthermore, it is also preferred that the seed crystals have a small particle size and a high specific surface area, or comprise agglomerates having a small crystallite size and a high specific surface area.

Seed crystals can be produced from an appropriate hexaaluminate material by subjecting this to a suitable mechanical and/or chemical treatment, for example milling in the dry state, milling in the presence of water or milling in the presence of acids or bases.

In a particularly preferred embodiment, the seed crystals are brought into contact with the aluminum source by intensive mixing. This mixing can be effected by milling, kneading, pan milling or other methods known to those skilled in the art. Mixing of the aluminum source with the seed crystals can be carried out before, during or after contacting with the cobalt-comprising compound and the at least one metal compound.

The aluminum oxide source can, firstly, be provided in the form of a solid, e.g. powder or granulated material, and secondly in liquid form. If the aluminum oxide source is present in liquid form, preference is given to the aluminum-comprising species being dispersed in the solvent or being present as colloidal particles in this. The stability of the colloidal aluminas or the formation of the colloidal aluminas can be improved by selecting a pH which is either in the range from 2 to 4.5 or in the range from 8 to 12.5. Suitable agents for producing or stabilizing the colloidal aluminas are acids such as $HNO_3$, acetic acid or formic acid or bases such as aqueous NaOH, KOH or ammonia solution.

In a preferred embodiment of the process of the invention, a colloidal alumina solution which has peptized alumina particles and a pH in the range from 2 to 4.5 is used.

The aluminum source is brought into contact with at least one metal compound. In the case of addition to the aluminum source present as a liquid, particular attention is paid to ensuring that no precipitation of the metal compounds or of the colloids is observed. The addition of seed crystals can occur before, during or after addition of the metal compounds. As an alternative, the seed crystals can also be added after the drying step.

In a further preferred embodiment of the process of the invention, a dispersible nanoparticulate aluminum oxide source is used as finely divided powder. The finely divided powder comprises primary particles which have a particle size of less than or equal to 500 nm and are present as agglomerates having a $D_{50}$ of from 1 to 100 μm.

In this preferred embodiment, the aluminum source is brought into contact with at least one metal compound. The metal compound can be added either as solution or as a solid. In the case of a solid, a liquid is subsequently added. In the addition of the solution or the liquid, particular attention is paid to ensure that a homogeneous, dough-like composition which is kneadable and displays very intimate mixing of the aluminum oxide source and the metal compound is formed. The addition of seed crystals can occur before or after addition of the metal compounds. An important feature of this preferred embodiment is that extrusion as shaping step (i.e. step (vi)) precedes drying (i.e. step (iv)).

In another preferred embodiment of the process of the invention, the finely divided powder of the aluminum source is brought into contact with at least one fusible metal compound. The intimate mixing of the aluminum oxide source and the fusible metal compound is carried out at a temperature in the range from 25° C. to 250° C. In selecting the temperature, particular attention is paid to ensure that it is above the melting point of the metal compound. Melting of the metal compound results in particular homogeneous distribution of the components in the mixture. The addition of seed crystals can occur before, during or after addition of the metal compounds. As an alternative, the seed crystals can also be added only after cooling of the mixture.

The low-temperature calcination of the dried mixture or of the molded and dried material obtained after the above-mentioned process steps serves basically to remove the anions from the metal compounds used and convert them into the corresponding metal oxides. The temperature in the calcination depends on the metal compounds used and is preferably less than or equal to 550° C. and more preferably in the temperature range from 150° C. to 550° C.

The high-temperature calcination of the molded and dried mixture or of the low-temperature-calcined mixture obtained by above-mentioned process steps is an important process step in the preparation of the catalyst of the invention. The temperature in the high-temperature calcination must be higher than 800° C. and is preferably equal to or greater than 850° C. and more preferably equal to or greater than 900° C.

It is also important to carry out the calcination for a period of time which is greater than 0.5 hour, more preferably greater than 1 hour and particularly preferably greater than 12 hours.

In a further preferred embodiment of the process of the invention, the low-temperature calcination (v) and high-temperature calcination (vii) steps can be carried out in a continuous process step. This is particularly advantageous when the drying step is preceded by a shaping step.

If the temperature in the calcination is below the target temperature of 800° C., preparation of the catalyst of the invention is adversely affected since the formation of hexaaluminate fails or an excessively low proportion of hexaaluminate is formed. If a calcination temperature above the suitable temperature range is chosen, two phases which have some catalytic activity are formed, but these materials have a surface area which is too low. The upper limit to the calcination temperature in the calcination is 1500° C., preferably 1450° C. and more preferably 1400° C.

It is conceivable that the invention could be specified in more detail by setting down of specific calcination conditions. However, in industrial operation, a very long calcination time is uneconomical and undesirable.

For the specific application of the material as catalyst for producing synthesis gas, a high surface area is required. For the purposes of the invention, materials having, in particular, surface areas of greater than 2 $m^2/g$ are preferred, materials having surface areas greater than 4 $m^2/g$ are particularly preferred, materials having surface areas greater than 8 $m^2/g$ are very particularly preferred and materials having surface areas greater than 15 $m^2/g$ are very particularly preferred.

A shaping process is important for the preparation of the catalyst so that the catalyst can be used in a suitable way in a tube reactor. This is also related to the fact that boehmite, which is particularly preferably used as aluminum oxide source, is preferably particularly finely divided, with the primary particle size preferably being in the range from 10 to 500 nm. Direct introduction of such a very finely divided catalyst prepared from a finely divided powder would lead, in a tube reactor, to a high pressure drop or to complete blocking of the reactor, which would adversely affect the catalytic reforming process.

The material prepared by the process of the invention can be used in reforming to produce synthesis gas in the form of loose material, pellets or extrudates. The choice of the appropriate catalyst form depends on the prevailing process conditions which are important for the production of synthesis gas.

Shaping is usually carried out after the process steps (iii) or (v), but can also be undertaken after process step (vii).

The production of a pelletized shaped body is carried out by means of the steps (x.1) compacting, (x.2) sieving and (x.3) tabletting. Binders and lubricants can be added to the catalyst material or precursor material used for compacting and tabletting. As lubricants, it is possible to use, for example, graphite or stearic acid. Preference is given to using graphite. The amount of lubricant is usually not more than 10% by weight based on the catalyst material.

In addition, it is also possible to produce the target fraction by means of a compacting machine which carries out a plurality of steps in succession. The loose material produced by the compacting machine can possibly have a lower mechanical stability than the material produced by the pressing machine.

Furthermore, it is also possible for a shaped body to be produced by means of an extrusion step. Such an extrusion can be carried out after step (ii) or step (iii) of the production process.

Apart from the above, it is also possible for the suspension to be dried by means of a spray drier and subsequently be subjected to a calcination process.

As binder material for compacting and tabletting, an oxide or a plurality of oxides can be added to the catalyst or particular oxides can be formed during the synthesis of the material by means of specific process features or process steps. Such process features or process steps can be, inter alia: preferred selection of the stoichiometry of the starting compounds, preferred selection of the type of starting compounds and in particular of the aluminum source, preferred selection of the thermal treatment steps. A particularly suitable binder material has a positive effect on the formation of a high surface area of the catalyst of the invention.

Examples of oxides which are formed from the binder material during calcination and represent particularly preferred secondary phases are, inter alia: theta-aluminum oxide, alpha-aluminum oxide, lanthanum aluminate ($LaAlO_3$), barium aluminate ($BaAl_2O_4$), strontium aluminate ($SrAl_2O_4$) La-stabilized aluminum oxide, La-stabilized aluminum oxide hydroxide.

In a further embodiment, it is, for example, possible to apply the catalyst or the catalyst precursor material to a ceramic support material by means of a coating process. As support material, it is possible to use a ceramic honeycomb body or other shaped bodies.

To produce a particularly effective catalyst, it is necessary for the stoichiometry of the elements which form the catalyst material to be in a particular preferred range.

For the present purposes, the preferred range of the composition is in each case based on the metallic elements and reported in mol percent. The numbers add up to one hundred parts, with the presence of oxygen not being taken into account.

For the purposes of the invention, preference is given to a hexaaluminate-comprising material whose cobalt content is preferably in the range 2-15 mol %, particularly preferably in the range 3-10 mol %, in particular in the range 4-8 mol %.

For the purposes of the invention, preference is given to a hexaaluminate-comprising material which has at least one metal species which is present in addition to cobalt and is selected from the group consisting of barium, strontium and lanthanum, where the metal content of this at least one metal species is preferably in the range 2-25 mol %, more preferably in the range 3-15 mol % and in particular in the range 4-10 mol %.

Further promoters such as magnesium, gallium, nickel are, for the purposes of the invention, preferably added in an amount of less than 10 mol % to the material.

Some examples of materials which have a preferred composition are given below:

A particularly preferred material has a composition in which the La content is in the range 3-20 mol %, the Co content is in the range 2-10 mol %, the content of noble metal-comprising promoter or additional promoter is in the range 0.25-3 mol % and the Al content is in the range 70-90 mol %.

A further example of a material which is preferred according to the invention has a composition in which the content of La and/or Ba is in the range 3-20 mol %, the content of Co is in the range 2-10 mol %, the content of noble metal-comprising promoter is in the range 0.1-3 mol % and the content of aluminum is in the range 70-90 mol %.

Very particular preference is given to a material having a composition in which the content of La and/or Sr is in the range 3-20 mol %, the Co content is in the range 2-10 mol %, the content of noble metal-comprising promoter or additional promoter is in the range 0.25-3 mol % and the Al content is in the range 70-90 mol %.

Very particular preference is given to a material having a composition in which the Ba content is in the range 3-20 mol %, the Co content is in the range 2-10 mol %, the content of noble metal-comprising promoter or additional promoter is in the range 0.25-3 mol % and the Al content is in the range 70-90 mol %.

Very particular preference is given to a material having a composition in which the Sr content is in the range 3-20 mol %, the Co content is in the range 2-10 mol %, the content of noble metal-comprising promoter or additional promoter is in the range 0.25-3 mol % and the Al content is in the range 70-90 mol %.

According to the invention, preference is given to those cobalt hexaaluminate-comprising catalysts whose molar ratio of cobalt to aluminum (i.e. the $n_{Co}/n_{Al}$ ratio) is in the range from 0.05 to 0.09 and particularly preferably in the range from 0.06 to 0.08. In a preferred embodiment of the catalyst of the invention, the molar ratio of $M^{BaSrLa}$ to aluminum (i.e. the $n_{MBaSrLa}/n_{Al}$ ratio) is in the range from 0.09 to 0.25, particularly preferably in the range from 0.092 to 0.20. The molar ratio of Co to $M^{BaSrLa}$ (i.e. the $n_{Co}/n_{MBaSrLa}$ ratio) is preferably in the range from 1.0 to 0.3 and particularly preferably in the range from 0.85 to 0.40. The abbreviation $M^{BaSrLa}$ indicates that at least one element from the group consisting of Ba, Sr, La is comprised.

If the preparation of the catalyst is carried out by impregnation using a metal salt solution: suitable metal salts are all salts which can be dissolved in a solvent in order to be able to produce a very homogeneous distribution of the metal species on the surface of the aluminum source, preferably the boehmite.

The metal salts introduced are preferably nitrates or hydrating nitrates. Water is used as preferred solvent.

The aluminum source preferably comprises only small amounts of nitrate or is nitrate-free. Considering the nitrate content and the total content of all metallic components in the synthesis system (i.e. Al together with Co and the further metals), the nitrate content is preferably less than 40 mol %, more preferably less than 25 mol % and even more preferably less than 18 mol %.

It is conceivable for noble metal-comprising salts which act as promoters and lead to an increase in the activity of the catalyst to be added as secondary constituents to the impregnation solution. However, it also has to be taken into account that, for example, the use of noble metal-comprising promoters can lead to an increase in the cost of the catalyst. Preferred noble metals as promoters are, inter alia, platinum, rhodium, palladium.

As regards the introduction of the noble metal-comprising promoters, it may be said that these can be introduced during the catalyst synthesis or can be deposited on the finished catalyst.

Reforming Process

The invention also provides a process for the reforming of hydrocarbons, preferably methane, in the presence of carbon dioxide, wherein the process comprises the following steps:
(a.1) contacting of a reforming gas comprising more than 70% by volume of hydrocarbons, preferably methane, and carbon dioxide with a catalyst whose preparation comprises the abovementioned process steps (i) to (vii),
(a.2) heating of the reactor or the catalyst present therein at a temperature greater than 700° C., preferably greater than 800° C. and more preferably greater than 900° C., during contacting with the reforming gas,
(a.3) operation of the reactor at a process pressure greater than 5 bar, preferably greater than 10 bar and more preferably greater than 15 bar, while carrying out the reaction,
(a.4) passing a reforming gas stream over the catalyst at a GHSV in the range from 500 to 20 000 hr$^{-1}$, preferably in the range from 1500 to 10 000 hr$^{-1}$ and more preferably in the range from 2000 to 5000 hr$^{-1}$.

In a preferred embodiment of the process of the invention, the reforming process is preceded by an activation process. The activation process makes it possible to set the catalyst to the desired process parameters under controlled conditions.

The activation process comprises the thermal treatment of the catalyst in a reducing gas atmosphere at a temperature in the range from 300° C. to 900° C. The catalyst is preferably heated to the process temperature using a controlled heating process. The heating rate is preferably in the range from 1° C./min to 30° C./min, with a range from 5° C./min to 15° C./min being preferred.

The activation process is preferably coupled with conditioning of the catalyst, or the conditioning follows the activation. For the purposes of the present invention, conditioning is a procedure in which the catalyst is brought stepwise to the process parameters of the target reaction. The conditioning step effectively prevents uncontrolled coke formation of the catalyst during start-up.

The conditioning of the catalyst comprises, for example, heating the catalyst to the process temperature in the presence of methane, steam and/or hydrogen. It is also possible for the catalyst to be conditioned in the presence of steam.

The reforming gas, which forms the main constituent of the feed fluid, has a preferred composition in which the total proportion of hydrocarbon, preferably methane, and carbon dioxide is greater than 70% by volume.

The methane and the carbon dioxide are preferably present in equimolar or virtually equimolar amounts in the feed fluid. A preferred ratio of methane to carbon dioxide is in the range from 4:1 to 1:2, particularly preferably in the range from 3:1 to 3:4, very particularly preferably in the range from 2:1 to 3:4. The most preferred ratio of methane to carbon dioxide is, as mentioned above, 1:1. If the hydrocarbon-comprising starting gas is ethane, carbon dioxide and ethane are present in a ratio of 2:1.

Steam is introduced into the feed fluid during the process. The proportion of steam in the feed fluid is preferably equal to or less than 30% by volume, more preferably equal to or less than 20% by volume and even more preferably equal to or less than 15% by volume. A preferred reforming gas composition comprises the components $CH_4/CO_2/H_2O$ in a percentage ratio range of the gas volumes from 35/35/30 to 48/48/4, more preferably in the range from 43/43/14 to 45/45/10.

For process engineering reasons, standard gases or auxiliary gases can be added to the reforming gas. The standard gas is, for example, a noble gas which is added in a proportion of from 1 to 5% by volume. The addition of an internal standard in laboratory tests serves to determine the recovery.

In a preferred process variant, a synthesis gas having an $H_2/CO$ ratio in the range from 0.85 to 1.4 is produced by means of the process of the invention; the $H_2$/CO ratio is more preferably in the range from 0.9 to 1.2 and even more preferably in the range from 0.95 to 1.1.

The process of the invention makes it possible to carry out the reforming process under severe process conditions without a significant amount of coke being deposited on the hexaaluminate-comprising catalyst as a result. Owing to the very high thermal stability and pressure resistance of the catalyst, the latter can be used over long process running times.

In a preferred embodiment, the reforming process of the invention using the catalyst of the invention is distinguished by the cobalt species being present in the cobalt hexaaluminate phase of the catalyst and remaining predominantly in the hexaaluminate phase while carrying out the process. Thus, the catalyst obtained after carrying out this preferred process has only a very low content of metallic cobalt species.

Carrying out reforming at high process pressures is advantageous since a synthesis gas which is also under a very high pressure is formed. The synthesis gas can be used for further processes in which the synthesis gas as starting material has to be present under high pressure. The downstream processes can be the synthesis of methanol, a Fischer-Tropsch synthesis or other gas-to-liquid syntheses. The synthesis gas is preferably used for downstream processes in which it is necessary to have an $H_2$/CO ratio which can also be provided by the process of the invention using the hexaaluminate-comprising catalysts.

Since the process of the invention is able to provide a synthesis gas which is under high pressure, the process of the invention is superior to the processes known from the prior art.

I. Example of the Preparation of a Catalyst According to the Invention

To prepare the catalyst E3, cobalt nitrate and a lanthanum nitrate present in a glass beaker are firstly admixed with 250 ml of distilled water and dissolved completely. The cobalt nitrate is 83.1 g of $Co(NO_3)_3 \times 6H_2O$ and the lanthanum nitrate is 284.9 g of $La(NO_3)_3 \times 6H_2O$. The metal salt solution is admixed with 250 g of boehmite, whereupon a suspension is formed. The boehmite used is Disperal from SASOL.

The suspension is stirred by means of a mechanically driven stirrer for a period of 15 minutes at a stirrer speed of 2000 rpm. The suspension is subsequently introduced dropwise by means of a pipette into a cold bath composed of liquid nitrogen in order to freeze out almost spherical particles having a particle diameter of 5 mm. The frozen suspension particles are firstly dried by means of a freeze drying unit and subsequently pressed through a sieve to break them up. The mesh opening of the sieve used here is 500 μm.

After freeze drying and comminution, the material is precalcined at 520° C. in a furnace. The calcined material is then pressed by means of a punch press to give pellets, the pellets are subsequently comminuted and pressed through a sieve having a mesh opening of 1 mm. The pellets have a diameter of 13 mm and a thickness of 3 mm. The target fraction has a particle size of from 500 to 1000 μm.

For the high-temperature calcination, the material obtained after sieving is heated at 1100° C. in a muffle furnace for 30 hours while passing a stream of air of 6 liters/minute over the material. The furnace is heated at a heating rate of 5° C. to the temperature of 1100° C.

The catalysts according to the invention E1 and E2 were produced by the synthesis procedure described for E3, with the amounts of cobalt nitrate and lanthanum nitrate being selected so as to obtain the catalyst samples which have the molar stoichiometries indicated in Table 1.

To produce the catalyst E4, which is an example of a catalyst according to the invention and comprises strontium cobalt hexaaluminate, 64.7 g of cobalt acetate, 71.2 g of strontium acetate and 250 g of boehmite (Disperal) were used. It was produced by a method analogous to the synthesis procedure described for E3.

II. Catalysis Tests

To illustrate the process of the invention, six different hexaaluminate-comprising catalyst samples (B1 to B3 and E1 to E3) were tested under the process conditions for the conversion of reforming gas in a laboratory catalysis apparatus having six reactors arranged in parallel. The catalyst samples B1 to B3 were hexaaluminate-comprising samples produced from nickel nitrate and lanthanum nitrate salts. The samples E1 to E3 were prepared from cobalt nitrate and lanthanum nitrate salts. The catalyst samples B1 to B3 were obtained by the same preparative process as the catalysts of the invention E1 to E3, which is described under point I., using a nickel nitrate salt instead of the cobalt nitrate salt. An overview of the composition of the catalysts tested is given in table 1.

To carry out the tests, samples were introduced into the individual reactors, using a minimum amount of in each case 20 ml of sample per test. The reforming tests were carried out at a temperature of 850° C. and at a temperature of 950° C. As process parameters, a pressure of 20 bar was selected and a GHSV of 3800 hr$^{-1}$ was selected. The composition of the product fluids obtained in the reactions was determined by means of GC analyses using an Agilent GC equipped with two TCDs and one FID.

Test Series 1

A summary of the process conditions and the catalysis data achieved in the reforming tests is shown in table 2.

As regards the catalyst tests, it may be said that the test conditions during the test were changed stepwise in order to increase the severity (the severity level of the process conditions) and thus set more severe process conditions. The change related to the composition of the feed fluid and the temperature of the tests. To designate the different test stages, an ending from the series S1, S2, S3, . . . S9 relating to the conditions of the respective test stage was in each case added to the sample numbers in table 2. The testing of the catalyst samples was stopped when coke formation commenced, which was detected by means of a decrease in activity in the conversion of methane.

The tests were carried out in the presence of 5% by volume of argon as standard gas, which was added to the feed fluid for analytical reasons in order to monitor the recovery.

The starting point for each of the tests was the steam reforming conditions of stage 1 (i.e. designated by S1 in table 2) in which the samples were subjected to a reaction temperature of 850° C. and a methane:$H_2O$ ratio of 1:1.

In the second stage (i.e. stage S2), the catalysts were subjected to trireforming conditions in which the feed fluid comprised methane, carbon dioxide and steam.

In stages 3 to 7, the addition of steam was entirely omitted, but hydrogen was added to the feed fluid. The proportion of hydrogen was reduced stepwise from 40% by volume to 10% by volume from stage 3 through to stage 7, while the proportion of methane and carbon dioxide was in each case increased from 27.5% by volume to 42.5% by volume. An exception is the transition from stage 4 to stage 5, in which the catalyst temperature was increased from 850° C. to 950° C. but the composition of the feed fluid was kept constant.

From step 8 onward, hydrogen was again added to the feed fluid, but compared to stage 7, half of the hydrogen (i.e. 5% by volume of $H_2$) was replaced by steam. From stage 9 onward, the addition of hydrogen to the feed fluid was completely omitted, and the proportion of steam was increased from 5% by volume to 10% by volume.

The cobalt-comprising hexaaluminates displayed a greater activity than the nickel-comprising hexaaluminates at higher process severity (i.e. at increased severity). Thus, in the case of samples B1, B2 and B3, coke formation commenced from test stages S5, S7 and S6, so that the tests had to be stopped at these test stages. The time until commencement of coke formation was here in the range from 260 to 360 hours. The commencement of coke formation on the catalyst samples has been denoted by the letters KA in table 2.

The cobalt-comprising hexaaluminate samples E1, E2 and E3, on the other hand, could still be used under the reaction conditions of process stages S8 and S9. During test stage S9, the catalyst samples were tested at a temperature of 950° C., with the feed gas having a composition of 42.5% by volume of methane, 42.5% by volume of carbon dioxide and 10% by volume of $H_2O$.

Table 1 shows the composition of the catalyst samples B1 to B3 and E1 to E3 (the values indicated are in mol %), the associated BET surface area (SA—surface area) and the bulk density (LBD=loose bulk density).

| Sample | Ni | Co | La | Al | SA [m$^2$/g] | LBD [g/ml] |
|---|---|---|---|---|---|---|
| B1 | 6 | | 8 | 86 | 6.1 | 0.953 |
| B2 | 6 | | 10 | 84 | 4.0 | 1.042 |
| B3 | 6 | | 14 | 80 | 3.1 | 1.196 |
| E1 | | 6 | 8 | 86 | 13.8 | 0.953 |
| E2 | | 6 | 10 | 84 | 7.1 | 1.036 |
| E3 | | 6 | 14 | 80 | 8.3 | 1.008 |

Table 2 shows a summary of the composition of the catalysts tested, the reaction conditions and the conversions.

| Example | Temp. [° C.] | CH$_4$ [vol. %] | CO$_2$ [vol. %] | H$_2$O [vol. %] | H$_2$ [vol. %] | CH$_4$ conv. [%] | CO$_2$ conv. [%] | H$_2$/CO ratio |
|---|---|---|---|---|---|---|---|---|
| B1_S1 | 850 | 47.5 | — | 47.5 | 0 | 32 | | 4.4 |
| B1_S2 | 850 | 27.5 | 27.5 | 40 | | 50 | 24 | 1.7 |
| B1_S3 | 850 | 27.5 | 27.5 | — | 40 | 4 | 56 | 1.35 |
| B1_S4 | 850 | 32.5 | 32.5 | — | 30 | 36 | 73 | 1.2 |
| B1_S5 | 950 | 32.5 | 32.5 | — | 30 | | | KA |
| B2_S1 | 850 | 47.5 | — | 47.5 | — | 40 | | 4.5 |
| B2_S2 | 850 | 27.5 | 27.5 | 40 | — | 65 | 30 | 1.6 |
| B2_S3 | 850 | 27.5 | 27.5 | — | 40 | 6 | 58 | 1.6 |
| B2_S4 | 850 | 32.5 | 32.5 | — | 30 | 4 | 40 | 1.45 |
| B2_S5 | 950 | 32.5 | 32.5 | — | 30 | 40 | 75 | 1.2 |
| B2_S6 | 950 | 37.5 | 37.5 | — | 20 | 55 | 85 | 1.05 |
| B2_S7 | 950 | 42.5 | 42.5 | — | 10 5 | | | KA |
| B3_S1 | 850 | 47.5 | — | 47.5 | — | 34 | | 4.8 |
| B3_S2 | 850 | 27.5 | 27.5 | 40 | — | 52 | 23 | 1.7 |
| B3_S3 | 850 | 27.5 | 27.5 | — | 40 | 4 | 56 | 1.71 |
| B3_S4 | 850 | 32.5 | 32.5 | — | 30 | 36 | 75 | 1.25 |
| B3_S5 | 950 | 32.5 | 32.5 | — | 30 | 58 | 80 | 1.4 |
| B3_S6 | 950 | 37.5 | 37.5 | — | 20 | | | KA |
| E1_S1 | 850 | 47.5 | — | 47.5 | — | 25 | | 6 |
| E1_S2 | 850 | 27.5 | 27.5 | 40 | — | 35 | 16 | 1.7 |
| E1_S3 | 850 | 27.5 | 27.5 | — | 40 | 17 | 66 | 1.6 |
| E1_S4 | 850 | 32.5 | 32.5 | — | 30 | 18 | 63 | 1.08 |
| E1_S5 | 950 | 32.5 | 32.5 | — | 30 | 60 | 86 | 1.28 |
| E1_S6 | 950 | 37.5 | 37.5 | — | 20 | 62 | 85 | 1.05 |
| E1_S7 | 950 | 42.5 | 42.5 | — | 10 | 57 | 79 | 0.86 |
| E1_S8 | 950 | 42.5 | 42.5 | 5 | 5 | 60 | 74 | 0.86 |
| E1_S9 | 950 | 42.5 | 42.5 | 10 | — | 82 | 78 | 1.1 |
| E2_S1 | 850 | 47.5 | — | 47.5 | — | 5 | | 12 |
| E2_S2 | 850 | 27.5 | 27.5 | 40 | — | 8 | 2 | 2.25 |
| E2_S3 | 850 | 27.5 | 27.5 | — | 40 | 25 | 70 | 1.6 |
| E2_S4 | 850 | 32.5 | 32.5 | — | 30 | 41 | 75 | 1.2 |
| E2_S5 | 950 | 32.5 | 32.5 | — | 30 | 65 | 90 | 1.3 |
| E2_S6 | 950 | 37.5 | 37.5 | — | 20 | 68 | 90 | 1.09 |
| E2_S7 | 950 | 42.5 | 42.5 | — | 10 | 71 | 89 | 0.93 |
| E2_S8 | 950 | 42.5 | 42.5 | 5 | 5 | 75 | 85 | 0.93 |
| E2_S9 | 950 | 42.5 | 42.5 | 10 | — | 82 | 79 | 1.0 |
| E3_S1 | 850 | 47.5 | — | 47.5 | — | 6 | | 7.2 |
| E3_S2 | 850 | 27.5 | 27.5 | 40 | — | 10 | 5 | 1.82 |
| E3_S3 | 850 | 27.5 | 27.5 | — | 40 | 30 | 74 | 1.55 |
| E3_S4 | 850 | 32.5 | 32.5 | — | 30 | 38 | 74 | 1.2 |
| E3_S5 | 950 | 32.5 | 32.5 | — | 30 | 65 | 90 | 1.3 |
| E3_S6 | 950 | 37.5 | 37.5 | — | 20 | 68 | 90 | 1.08 |
| E3_S7 | 950 | 42.5 | 42.5 | — | 10 | 70 | 88 | 0.92 |
| E3_S8 | 950 | 42.5 | 42.5 | 5 | 5 | 74 | 85 | 0.92 |
| E3_S9 | 950 | 42.5 | 42.5 | 10 | — | 85 | 75 | 1.15 |

Test Series 2

Part of the catalyst sample from the experimental example E2 was subjected to a further catalytic test under altered test conditions. The composition of the feed and the test procedure 2 are shown in table 3. In the test, the sample E2 was supplied with a feed which had very low steam partial pressures compared to the tests shown in table 2. Test procedure 2 is changed from the first test procedure in that hydrogen was added to the feed gas only in a few process stages. In those process stages in which hydrogen was introduced into the feed gas, the content of hydrogen was low and was 5% by volume or 10% by volume. In the first process stages (S01 to S04), the thermodynamic equilibrium was not achieved, even approximately. A conceivable explanation of the failure to achieve a state in the vicinity of the thermodynamic equilibrium would be that the catalyst has initially been reduced only incompletely at the high steam partial pressures.

An unexpected finding was that the catalyst E2 displayed a very high catalytic activity over an extremely long period of time under the high-severity conditions (i.e. extremely harsh and demanding process conditions) and this was maintained over a very long period time of more than 250 hours. After the end of the test, the catalyst was removed from the reactor and displayed no coke deposits. The results thus demonstrate the high resistance to coke formation of the catalyst during operation of the catalyst under the process conditions indicated in table 3. At the same time, a product stream having an advantageous ratio of H2 to CO was obtained.

Table 3 shows the test conditions and results for the testing of catalyst sample E2 using test procedure 2 with changed process stages (S01 to S05). The catalytic measurements were carried out at 850° C.

| Example | TOS [h] | $CH_4$ [vol. %] | $CO_2$ [vol. %] | $H_2O$ [vol. %] | $H_2$ [vol. %] | $CH_4$ conv. [%] | $CO_2$ conv. [%] | $H_2/CO$ ratio |
|---|---|---|---|---|---|---|---|---|
| E2_S01 | 0-94 | 27.5 | 27.5 | 40.0 | 0 | 10-33 | 3-9 | 1.7-1.9 |
| E2_S02 | 94-141 | 32.5 | 32.5 | 30.0 | 0 | 37-31 | 21-19 | 1.4 |
| E2_S03 | 141-167 | 37.5 | 37.5 | 20.0 | 10.0 | 30 | 33-31 | 1.3-1.4 |
| E2_S04 | 167-191 | 37.5 | 37.5 | 25.0 | 5.0 | 29-26 | 28-27 | 1.2 |
| E2_S05 | 191-453 | 37.5 | 37.5 | 20.0 | 0 | 26-65 | 23-57 | 1.1-1.0 |

Test Series 3

In a further trial, examples of catalysts according to the invention which had been prepared as described in Examples E1, E2 and E4 and a comparative sample which had been prepared as described in Example B2 were subjected to catalytic reforming in which a hydrogen-free feed gas was used. The results of these studies and the experimental conditions in respect of the temperature and the feed gas composition are shown in Table 5. Samples E1 and E2 were hexaaluminate-comprising catalysts in which the hexaaluminate phase comprised cobalt and lanthanum, sample E4 was a hexaaluminate-comprising catalyst in which the hexaaluminate phase comprised cobalt and strontium and sample B2 was a hexaaluminate-comprising catalyst in which the hexaaluminate phase comprised nickel and lanthanum.

Compared to the catalysis experiments which were carried out in test series 1 and 2 and whose results are shown in Tables 2 and 3, a smaller amount of steam was added to the feed gas in test series 3. Overall, the feed gas in test series 3 has a low steam partial pressure and does not comprise any hydrogen (see Table 5). The test procedure used in test series 3 (i.e. test procedure 3) is divided into various process stages. In the first process stage (S001), the catalyst was brought into contact with a feed gas comprising an equimolar ratio of methane to water ($H_2O$ to $CH_4$=1.0). In the second process stage, a feed gas comprising an equimolar ratio of 27.5% by volume of methane and 27.5% by volume of carbon dioxide and additionally 40% by volume of $H_2O$ was used. In the next three process stages (S003-S005), the equimolar ratio of methane to carbon dioxide was then maintained while the water content was decreased stepwise from 30% by volume (in process stage S003) to 15% by volume (in process stage S005). (In process stage S005, the $H_2O$ to $CH_4$ ratio is 0.38.)

The results achieved in test series 3 show that the cobalt hexaaluminate-comprising catalyst samples E1, E2, E4 make a high catalytic activity and stable operation possible over long periods of time and under very severe process conditions (high-severity conditions) in particular at high temperatures and very low $H_2O$ partial pressures of only 15% by volume. In comparison, the nickel hexaaluminate-comprising sample B2 could be operated only up to process stage S003 (30% by volume of $H_2O$). Making the process conditions more severe led to rapid coking of the sample B2, so that the experiment had to be stopped.

The studies carried out on the samples E1, E2 and E4 were in each case stopped after a cumulative running time of more than a thousand hours and the samples were removed from the reactor tube. None of the samples recovered after the test had coke deposits. The results are thus a further finding which demonstrates the extremely high coking resistance of the cobalt hexaaluminate-comprising catalysts of the invention under the severe process conditions indicated in Table 5. At the same time, as can be seen from Table 5, a product stream having an advantageous ratio of $H_2$ to CO could be obtained in the catalysis experiments.

Table 4 shows the composition of the catalyst sample E4 (the values are reported in mol %), the associated BET surface area ("surface area") and the bulk density ("loose bulk density").

| Sample | Co | Sr | Al | SA [$m^2/g$] | LBD [g/ml] |
|---|---|---|---|---|---|
| E4 | 6 | 8 | 86 | 25.0 | 1.035 |

Table 5 shows the test conditions and results obtained in the examination of catalyst samples E1, E2, E4 and B2 in test series 3. Test series 3 was carried out using a test procedure (test procedure 3) in which the samples were in each case subjected to five process stages (S001 to S005). The catalytic tests were carried out at a temperature of 850° C. and a pressure of 20 bar.

| Example | Temp. [° C.] | $CH_4$ [vol. %] | $CO_2$ [vol. %] | $H_2O$ [vol. %] | $CH_4$ conv. [%] | $CO_2$ conv. [%] | $H_2/CO$ ratio |
|---|---|---|---|---|---|---|---|
| B2_S001 | 850 | 47.5 | — | 47.5 | 32 | — | 4.9 |
| B2_S002 | 850 | 27.5 | 27.5 | 40 | 43 | 16 | 1.7 |
| B2_S003 | 850 | 32.5 | 32.5 | 30 | 40 | 21 | 1.4 |
| B2_S004 | 850 | 37.5 | 37.5 | 20 | — | — | KA |
| B2_S005 | 850 | 40.0 | 40.0 | 15 | — | — | KA |
| E1_S001 | 850 | 47.5 | — | 47.5 | 58 | — | 3.8 |
| E1_S002 | 850 | 27.5 | 27.5 | 40 | 75 | 24 | 1.9 |
| E1_S003 | 850 | 32.5 | 32.5 | 30 | 62 | 33 | 1.6 |
| E1_S004 | 850 | 37.5 | 37.5 | 20 | 71 | 59 | 1.1 |
| E1_S005 | 850 | 40.0 | 40.0 | 15 | 65 | 65 | 1.0 |
| E2_S001 | 850 | 47.5 | — | 47.5 | 52 | — | 4.0 |
| E2_S002 | 850 | 27.5 | 27.5 | 40 | 77 | 31 | 1.8 |
| E2_S003 | 850 | 32.5 | 32.5 | 30 | 57 | 31 | 1.6 |
| E2_S004 | 850 | 37.5 | 37.5 | 20 | 70 | 58 | 1.1 |
| E2_S005 | 850 | 40.0 | 40.0 | 15 | 65 | 65 | 1.0 |
| E4_S001 | 850 | 47.5 | — | 47.5 | 41 | — | 4.4 |
| E4_S002 | 850 | 27.5 | 27.5 | 40 | 60 | 21 | 1.8 |
| E4_S003 | 850 | 32.5 | 32.5 | 30 | 72 | 49 | 1.3 |
| E4_S004 | 850 | 37.5 | 37.5 | 20 | 67 | 60 | 1.1 |
| E4_S005 | 850 | 40.0 | 40.0 | 15 | 64 | 64 | 1.0 |

FIG. 1 shows three diffraction patterns which were recorded on the catalyst samples E1, E2 and E3 according to the invention before the catalysis test (i.e. on the fresh catalyst samples E1-f to E3-f). The diffraction patterns of all three samples have reflections at 32.08, 34.01 and 36.10 °2θ which can be assigned to cobalt hexaaluminate and a reflection at 33.42° 2θ which can be assigned to the perovskite phase. Further crystalline phases cannot be discerned by means of the present XRD analysis.

Figure 2:
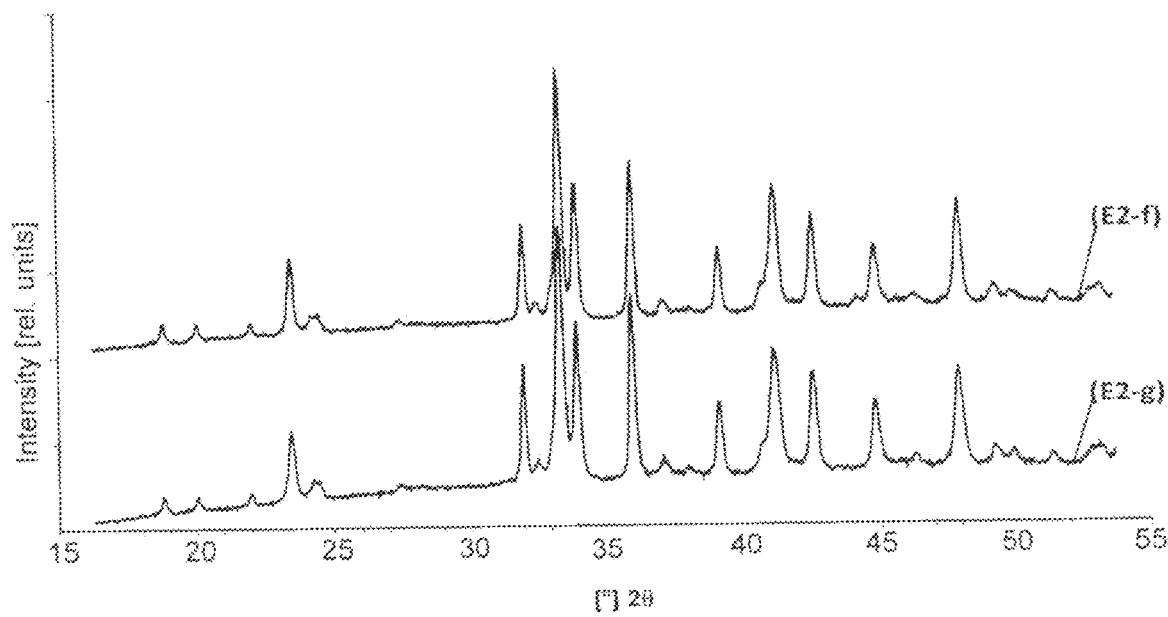
FIG. 2 shows two diffraction patterns, one recorded on a catalyst sample when fresh, and the other recorded on the catalyst sample when aged.

FIG. 2 shows two diffraction patterns which were recorded on catalyst samples E2 before and after the catalysis test and have been designated as E2-f (fresh catalyst sample) and E2-g (aged catalyst sample). The diffraction pattern recorded on the sample before the catalysis test was carried out displays no difference from the diffraction pattern recorded on the aged sample. It can be seen from the studies that the cobalt remains in the hexaaluminate phase and is not dissolved out from this. Cobalt in the form of the free metal could not be detected even in the aged sample.

Figure 3:
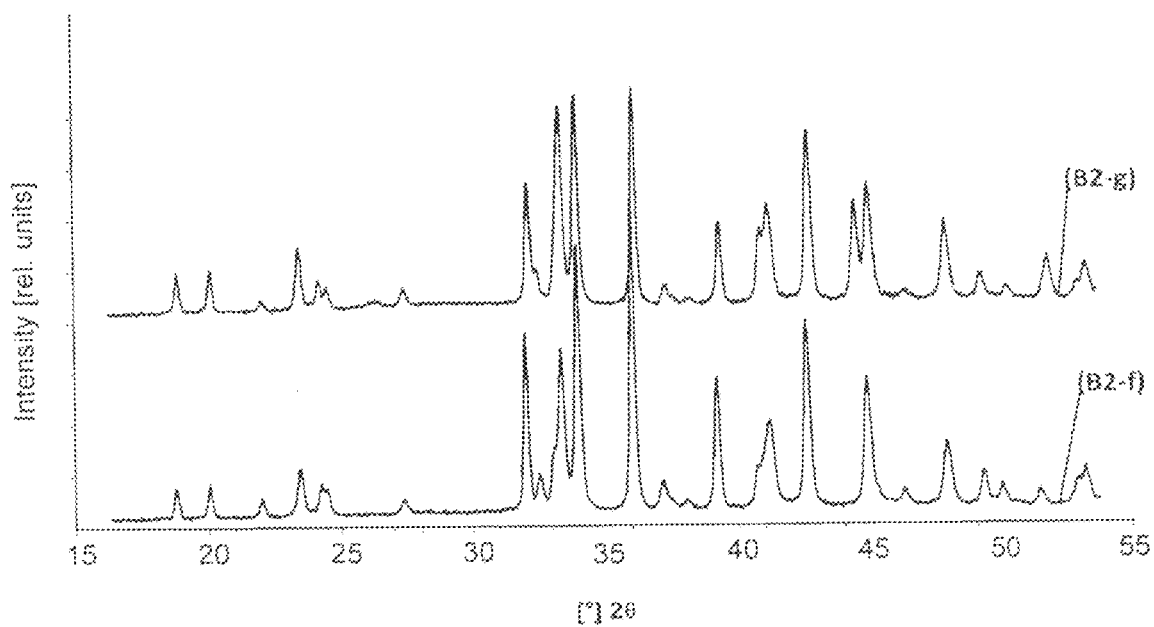
FIG. 3 shows two diffraction patterns, one recorded on a catalyst sample when fresh, and the other recorded on the catalyst sample when aged.

FIG. 3 shows two diffraction patterns recorded on the catalyst samples B2 before (i.e. sample B2-f) and after (i.e. sample B2-g) the catalysis test. The diffraction pattern recorded on the aged sample (B2-g) displays a reflection at 44.40°2θ, which can be assigned to a phase composed of metallic nickel. The metallic nickel phase cannot be discerned in the diffraction pattern of the fresh catalyst sample, since a corresponding reflection is not present.

Figure 4:
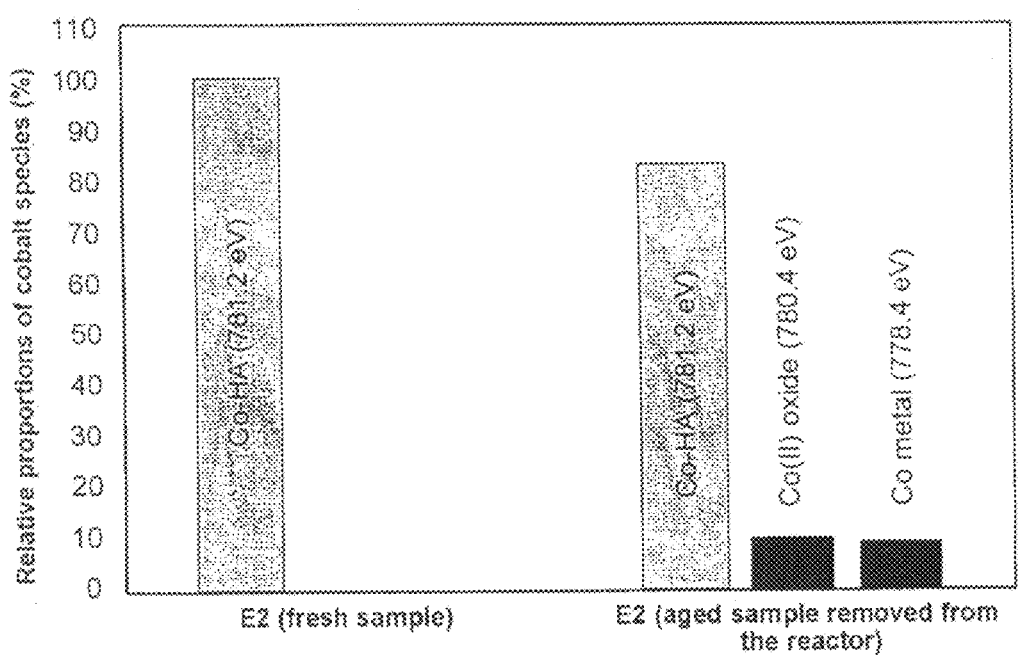
FIG. 4 shows results of XPS analyses of fresh and aged catalyst samples.

FIG. 4 shows the results of the XPS analyses which were in each case measured on a fresh catalyst sample E2-f and an aged catalyst sample E2-g. The cobalt species detected in the fresh sample E2-f can all be assigned to the cobalt hexaaluminate phase. The aged catalyst sample E2-g displays different cobalt species. It is noteworthy that the majority of the cobalt species can be assigned to the hexaaluminate phase and the content of metallic cobalt is only low.

The samples E2-f (fresh catalyst sample before catalysis testing) and E2-g (aged catalyst sample after catalysis testing) were each subjected to XPS analysis (XPS: X-ray photoelectron spectroscopy). The results of these XPS analyses are shown in Table 6. In the catalyst sample E2-f (i.e. the fresh catalyst), the cobalt is present exclusively as cobalt lanthanum hexaaluminate (Co—HA, 781.2 eV).

Table 6 shows the relative proportions of cobalt in the cobalt lanthanum hexaaluminate phase (Co—HA), the cobalt(II) oxide phase (Co(II) oxide) and the metallic cobalt phase (Co metal). In sample E2-g (i.e. the aged catalyst sample removed from the reactor), two further cobalt species, namely a cobalt(II) oxide (CoO, 780.4 eV) and a cobalt metal (Co metal, 778.4 eV) were detected in addition to the cobalt species present in the cobalt lanthanum hexaaluminate (Co—HA, 781.2 eV). Quantification of the XPS data (Table 6) confirms the unexpected finding that a significant proportion of nonmetallic cobalt is present in the aged sample and that the cobalt remains substantially in the cobalt lanthanum hexaaluminate phase. It can be assumed that the unexpected finding represents a critical characteristic of the catalyst of the invention and plays an important role in the extraordinary coking resistance and activity of the catalyst.

Table 6 summarizes the XPS data of a fresh sample of catalyst E2-f and an aged sample of catalyst E2-g after removal from the test reactor (n.d.=not detected).

|  | Relative proportions of cobalt species (%) | | |
| --- | --- | --- | --- |
|  | Co-HA (781.2 eV) | Co(II) oxide (780.4 eV) | Co metal (778.4 eV) |
| E2-f (fresh sample) | 100 | n.d. | n.d. |
| E2-g (aged sample) | 82.6 | 9.2 | 8.3 |

Physical characterization of all catalyst sample described in the examples was carried out by means of XRD analyses, nitrogen sorption measurements and bulk density measurements. The XRD analyses were carried out using a D8 Advance Series 2 from Bruker/AXS using a CuK alpha source (having a wavelength of 0.154 nm at 40 kV and 40 mA). The measurements were carried out over the measurement range: 5-80° (2 theta), 0.02° steps with 4.8 seconds/step.

The XPS analyses were carried out on a PHI 5000 VersaProbe spectrometer using Al K-α X-radiation (1486.6 eV, monochromator) and a 180° hemispherical analyzer with a 16-channel detector. A spot size of 200 μm (50 watt) was used in the measurements. The C1s peak (284.8 eV) was used for calibration of the energy axis of the XPS spectrum.

The invention claimed is:

1. A process for preparing a hexaaluminate-comprising catalyst, the process comprising:
   (i) contacting a finely divided aluminum oxide source, a metal salt which comprises at least a soluble or fusible cobalt- species, and a metal salt which comprises at least a soluble or fusible lanthanum-comprising species, wherein said finely divided aluminum oxide source is in the form of a solid,
   (ii) mixing the aluminum oxide source and the metal salt, to obtain a mixture,
      wherein at least one of the metal salts in (i) are in the form of a metal salt solution or following said mixing (ii) a liquid is added to said mixture,
   (iii) drying the mixture,
   (iv) low-temperature calcination of the mixture,
   (v) molding or shaping, and
   (vi) high-temperature calcination,
   wherein cobalt is incorporated into said hexaaluminate-comprising catalyst and said hexaaluminate-comprising catalyst comprises from 70 to 90 mol% aluminum, from 2 to 15 mol% cobalt, and from a total content of 2 to 25 mol% of La and at least one further element selected from the group consisting of Ba and Sr.

2. The process of claim 1, wherein the high-temperature calcination is carried out at a temperature of 800-1300° C., for more than 0.5 h, or wherein the low-temperature calcination is carried out at a temperature less than 550° C., for 0.1 to 24 h.

3. The process of claim 1, wherein:
   the molding or shaping is carried out before the drying,
   the drying is carried out together with the low-temperature calcination, or
   at least one step selected from the group consisting of (i) to (iii) is carried out in the presence of seed crystals and an amount of the seed crystals is in a range from 0.1 to 10% by weight.

4. The process of claim 1, wherein the metal salts comprise a soluble cobalt-comprising species and a soluble lanthanum-comprising species.

5. The process of claim 1, wherein the metal salts comprise a fusible cobalt-comprising species and a fusible lanthanum-comprising species.

6. The process of claim 1, wherein the high-temperature calcination is carried out at a temperature of 800-1300° C., for more than 0.5 h.

7. The process of claim 1, wherein the high-temperature calcination is carried out at a temperature of 800-1300° C., for more than 5 h.

8. The process of claim 1, wherein the high-temperature calcination is carried out at a temperature of 800-1300° C., for more than 10 h.

9. The process of claim 1, wherein the high-temperature calcination is carried out at a temperature of 850-1200° C., for more than 0.5 h.

10. The process of claim 1, wherein the high-temperature calcination is carried out at a temperature of 900-1100° C., for more than 0.5 h.

11. The process of claim 1, wherein the low-temperature calcination is carried out at a temperature of less than 550° C., for 0.1 to 24 h.

12. The process of claim 1, wherein the low-temperature calcination is carried out at a temperature of 250° C. to less than 550° C., for 0.1 to 24 h.

13. The process of claim 1, wherein the high-temperature calcination is carried out at a temperature of 800-1300° C., for more than 0.5 h, and the low-temperature calcination is carried out at a temperature of less than 550° C., for 0.1 to 24 h.

14. The process of claim 1, wherein the molding or shaping is carried out before the drying.

15. The process of claim 1, wherein the drying is carried out together with the low-temperature calcination.

16. The process of claim 1, wherein the contacting is carried out in the presence of seed crystals, and an amount of the seed crystals is in a range from 0.1 to 10% by weight.

17. The process of claim 1, wherein the intimate mixing is carried out in the presence of seed crystals, and an amount of the seed crystals is in a range from 0.1 to 10% by weight.

18. The process of claim 1, wherein the drying is carried out in the presence of seed crystals, and an amount of the seed crystals is in a range from 0.1 to 10% by weight.

19. The process of claim 1, wherein the molar ratio of Co to Al ranges from 0.03 to 0.17.

20. The process of claim 1, wherein the molar ratio of the at least one further element to Al ranges from 0.029 to 0.28.

21. The process of claim 1, wherein the molar ratio of cobalt to the at least one further element ranges from 1.0 to 0.6.

22. The process of claim 1, wherein the molar ratio of Co to Al ranges from 0.03 to 0.17, the molar ratio of the at least one further element to Al ranges from 0.029 to 0.28, and the molar ratio of cobalt to the at least one further element ranges from 1.0 to 0.6.

23. The process of claim 1, wherein said hexaaluminate-comprising catalyst comprises a secondary phase, where the total proportion of the secondary phase ranges from 3 to 40% by weight.

24. The process of claim 23, wherein the secondary phase comprises at least one oxide selected from the group consisting of an alpha-aluminum oxide, a theta-aluminum oxide, $LaAlO_3$, $BaAl_2O_4$, $SrAl_2O_4$, $CoAl_2O_4$, a La-stabilized aluminum oxide, and a La-stabilized aluminum oxide hydroxide.

25. The process of claim 1, wherein said hexaaluminate-comprising catalyst further comprises a secondary structure comprising at least one oxide selected from the group consisting of an alpha-aluminum oxide, a theta-aluminum oxide, $LaAlO_3$, $BaAl_2O_4$, $SrAl_2O_4$, $CoAl_2O_4$, a La-stabilized aluminum oxide, and a La-stabilized aluminum oxide hydroxide.

26. The process of claim 1, wherein said solid is a powder.

27. The process of claim 1, wherein said solid is a granulated material.

\* \* \* \* \*